Figure 1:
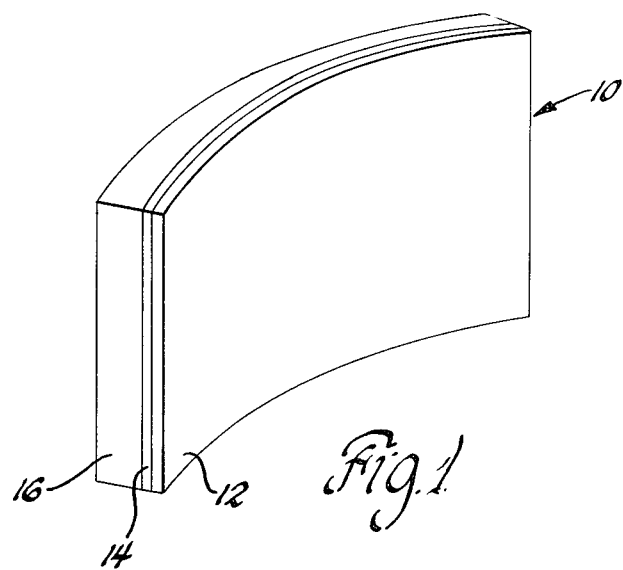

United States Patent [19]

Lee et al.

[11] 4,076,561

[45] Feb. 28, 1978

[54] METHOD OF MAKING A LAMINATED RARE EARTH METAL-COBALT PERMANENT MAGNET BODY

[75] Inventors: Robert W. Lee, Troy; John J. Croat, Sterling Heights, both of Mich.

[73] Assignee: General Motors Corporation, Detroit, Mich.

[21] Appl. No.: 732,924

[22] Filed: Oct. 15, 1976

[51] Int. Cl.² ............................................. H01F 1/02
[52] U.S. Cl. .................................. 148/103; 148/31.57; 148/105; 148/108; 264/60
[58] Field of Search ............... 148/101, 103, 105, 108, 148/31.57, 31.55; 264/57, 60, DIG. 58; 427/128; 335/302; 252/62.55

[56] References Cited

U.S. PATENT DOCUMENTS

| 3,502,584 | 3/1970 | Denes | 252/62.55 |
| 3,784,945 | 1/1974 | Baermann | 335/302 |
| 3,887,395 | 6/1975 | Martin | 148/31.57 |
| 3,892,603 | 7/1975 | Reid | 148/108 |

OTHER PUBLICATIONS

Strnat, K; Cobalt-Rare Earth Alloys as ... Perm. Mag. Materials, in Cobalt, 36, Sept. 1967, pp. 133-143.

*Primary Examiner*—Walter R. Satterfield
*Attorney, Agent, or Firm*—George A. Grove

[57] ABSTRACT

In a preferred embodiment thin layers of rare earth metal-cobalt powder comprising an outer layer of $RCo_5$ and a discrete transitional layer of $R_2Co_{17}$ are compressed against an adjacent thicker layer of iron powder to form a laminated green compact, with the rare earth-cobalt powdered material being magnetically aligned. The green laminate body is then sintered to densify the rare earth-cobalt material layer to a body wherein the pores are substantially noninterconnecting. The laminate structure is then magnetized. By this method a strong rare earth-cobalt ($RCo_5$) permanent magnet body is produced in which the rare earth-cobalt layer may be very thin (of the order of 1 to 2 millimeters) but of relatively large surface area and supported by a strong iron layer so as to be durable in handling, manufacturing and use.

It is possible to press an $RCo_5$ layer directly onto a powdered iron layer when the oxygen content of the iron is suitably low. The method will also produce an $R_2Co_{17}$-iron composite.

4 Claims, 2 Drawing Figures

U.S. Patent  Feb. 28, 1978  4,076,561

METHOD OF MAKING A LAMINATED RARE EARTH METAL-COBALT PERMANENT MAGNET BODY

This invention relates to rare earth metal-cobalt permanent magnets and, more particularly, to a method of making these brittle materials in large, thin sections, such as might be used as a pole piece in a small DC motor. In this application a strong, arcuate permanent magnet may be only a few millimeters thick but several square centimeters in area.

It is now well known that certain rare earth-cobalt ($RCo_5$, where R is a rare earth metal) permanent magnets provided the highest combination of magnetic flux and resistance to demagnetization (energy product) of any known permanent magnet material. A cobalt-rich composition $R_2Co_{17}$ is also known. It is a good permanent magnet but it does not have as high a coercivity at its present state of development as the $RCo_5$ phase. The rare earth-cobalt compositions are a family of materials containing one or more of the rare earth metals and cobalt. In general, the cobalt may be partially substituted for by iron, nickel, chromium or manganese. In general, these materials are presently processed by (1) forming the desired rare earth metal-cobalt composition phase, (2) grinding such bulk alloy to powder form, (3) mixing powders to the desired composition, (4) magnetically aligning and compacting the powder, (5) sintering, and (6) heat treating. Rare earth-cobalt permanent magnet materials are usually thus produced in the form of bricks or short disks or cylinders because they are quite brittle and will break if in the form of thin sections. If large magnets or irregular configurations are required, they have been produced by bonding together the smaller bricks or bars.

Because of their high resistance to demagnetization, the rare earth-cobalt materials could efficiently be employed in thin sheet-like sections, for example, as thin arcuate pole pieces in a small DC motor. However, heretofore it has not been practical to form rare earth-cobalt magnets in such shapes because they break during manufacture or upon usage. They are very brittle, and thin sections readily crack.

It is an object of this invention to provide a method of forming thin sheet-like sections of $RCo_5$ or $R_2Co_{17}$ phase rare earth-cobalt permanent magnets having a surface with dimensions much larger than the thickness of the piece wherein the magnet is supported by an iron base layer.

It is a more specific object of this invention to provide a powdered metal-sintering method of making a thin (e.g., 1 to 2 millimeters) rare earth-cobalt ($RCo_5$) magnet laminated to a powdered iron (or nickel, or cobalt) support layer while obtaining the excellent magnetic properties of the rare earth-cobalt composition. The iron powder and rare earth-cobalt powder are pressed in a laminated structure and simultaneously sintered for bonding and densification. Preferably a thin transitional layer of $R_2Co_{17}$ composition is employed to improve the bond between the iron base layer and the $RCo_5$ layer.

In accordance with a preferred embodiment of our invention, these and other objects and advantages are obtained by adding a thin layer of suitable rare earth-cobalt powder composition to a die. The composition should closely approximate the $RCo_5$ phase, although a suitable amount of a rare earth-cobalt alloy to enhance sintering may be employed. Such an alloy should contain a higher rare earth metal content than the $RCo_5$ phase. The powder is gently tamped down into a layer of uniform thickness. A thin uniform layer of $R_2Co_{17}$ composition is then formed in the die. A substantially thicker layer of iron powder or other ferromagnetic material is then applied over the layers of rare earth-cobalt material. It is not critical as to whether the rare earth-cobalt or iron material is first added to the die. The powder layers are then subjected to a magnetic field to align the rare earth-cobalt powder in a desired direction of magnetization. The powders are pressed into a laminated green compact while under the influence of the magnetic field. The green compact is then sintered under vacuum or in an inert atmosphere at a temperature that is particularly suitable to densify the rare earth-cobalt material into a layer in which the pores are substantially noninterconnecting. The compact may be further heat treated as desired to obtain optimum magnetic properties of the rare earth-cobalt layer. The final product is a laminate structure containing a thin layer portion, typically 1 to 2 millimeters in thickness, of an $RCo_5$ (e.g., $SmCo_5$) permanent magnet supported on and carried by a substantially thicker layer of iron or other suitable ferromagnetic materials, such as cobalt, or nickel, or ferromagnetic alloys of these transition elements.

By producing a laminated permanent magnet structure in accordance with our method as briefly summarized above, thin, relatively large area, sheet-like bodies of $RCo_5$ magnetic materials may be formed with less chance of breaking or cracking them in manufacture or in usage. We have found that the bond between the iron layer and the $RCo_5$ layer is markedly improved by the use of an interfacial layer of $R_2Co_{17}$ phase. However, we have also found that when the oxygen level in the initial iron powder is less than one atomic percent, the $RCo_5$ may be suitably bonded directly to the iron.

Figure 2:
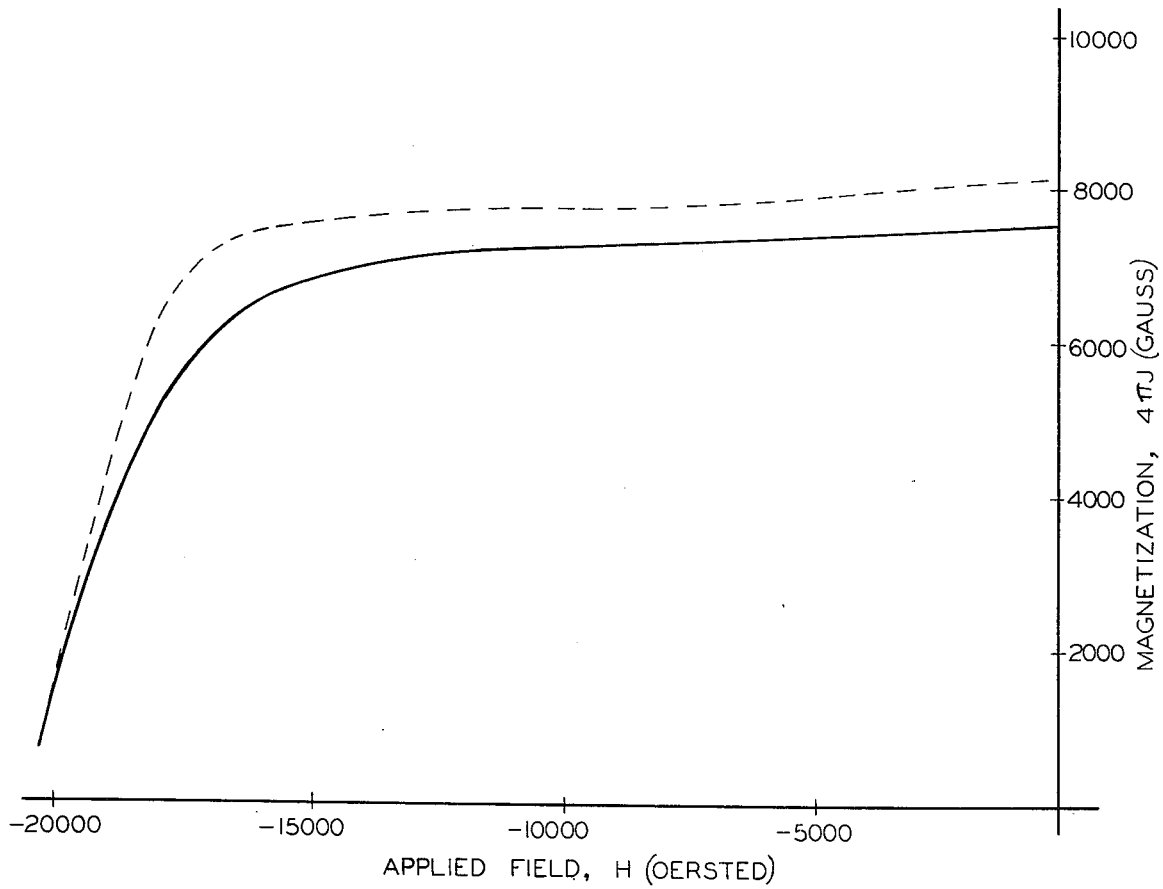

These and other objects and advantages of our invention will be better understood in view of a detailed description thereof which follows. Reference will be made to the drawings, in which:

FIG. 1 depicts an exemplary laminated magnet prepared in accordance with our method; and FIG. 2 is a graph of demagnetization curves for isostatically pressed $SmCo_5$, and the same $SmCo_5$ powder pressed and sintered onto a powdered iron base.

Referring to FIG. 1, there is illustrated a laminated permanent magnetic body 10 formed by compacting and sintering three distinct powder layers. Laminated body 10 has a relatively thin layer of $RCo_5$ (e.g., $SmCo_5$) permanent magnet composition 12 bonded to a very thin intermediate layer of $R_2Co_{17}$) 14 which is in turn bonded to a base or supporting layer 16 of iron, steel or other suitable ferromagnetic material. As an example, $RCo_5$ layer 12 may be 1 to 3 millimeters thick, $R_2Co_{17}$ layer 14 about 0.1 millimeter thick, and the support layer as thick as desired or necessary. The laminate structure 10 illustrated is useful, for example, as an arcuate pole piece in a DC motor wherein a thin but strong permanent magnet of rare earth-cobalt material can be usefully employed.

The practice of our method will be further illustrated by the following example.

Two parts by weight of a commercial $SmCo_5$ powder (34.6% by weight samarium) were milled with one part by weight of a commercial samarium-cobalt sintering aid composition containing 36.5% by weight samarium. The resulting mixture had a nominal particle size of $5\mu$. This powder mixture was poured into a 1.5 cm diameter rubber sleeve closed with a rubber plug at one end. The powder was lightly tamped or compacted into a generally uniform layer of about 3 millimeters in thickness. A thin layer of $Sm_2Co_{17}$ powder was sprinkled over the $SmCo_5$ layer. Commercially pure iron powder was then poured on top of the samarium-cobalt powders in a layer about 10 millimeters in thickness. The sleeve was closed with a second rubber plug and the powders were subjected to a pulsed magnetic field to magnetically align the rare earth-cobalt powder in a direction perpendicular to the powder layers. Precompaction of the powders was accomplished by additional magnetic pulsing with steel rams positioned against the rubber plugs. Excess rubber was then trimmed from the rubber sleeve and the powders were compressed in a hydraulic press at a pressure of 100,000 psi in a steady magnetic field of 10,000 Oersted. In this arrangement the pressure was applied uniformly in all directions. However, it will be appreciated that depending on the configuration of the laminate structure to be produced, the powders can be confined in a rigid mold and pressure applied uniaxially or biaxially.

The laminated green compact was removed from the mold. Despite the fact that the samarium-cobalt layers were quite thin the laminated piece was readily handled without breaking. The green compact was then heated in a vacuum furnace at 1115° C. for a period of 30 minutes. The composite was then slow-cooled (4° C. per minute) to 850° C., and then rapidly cooled in argon to room temperature. The dimensions of the compressed and sintered cylindrical compact were 1 centimeter in diameter by 1.3 centimeter in height.

The magnetic properties of the samarium-cobalt ($SmCo_5$) part of the iron-samarium-cobalt sandwich are illustrated in FIG. 2. Here are compared demagnetization curves for isostatically pressed samarium-cobalt $SmCo_5$ (- -), and the same samarium-cobalt $SmCo_5$ powder (—) pressed and sintered onto the powdered iron base as described in the above example. The iron was removed from the composite sample to facilitate measurement of the magnetic properties of the $SmCo_5$ layer. It is seen that the desirable permanent magnet properties of the samarium-cobalt compound are essentially retained while the strength and durability of the magnet is markedly increased by its lamination onto the iron base.

We have found that it is highly preferable to form an $R_2Co_{17}$ intermediate layer between the iron or other support layer and the $RCo_5$ layer. The intermediate layer is especially desirable if the support layer contains one atomic percent oxygen or more. The microstructural quality of the interface and the bond strength between the support layer and the magnet layer is greatly improved by the presence of the $R_2Co_{17}$ layer. This is visually evidenced by the fact that the iron-rare earth-cobalt interface is not marked by undue porosity due to migration of oxygen. This intermediate layer need only have a thickness sufficient to form a continuous layer between the iron and the $RCo_5$. However, if the support layer contains less than one atomic percent oxygen the intermediate $R_2Co_{17}$ layer may not be required. On the other hand, if a large $R_2Co_{17}$ magnet is desired, a two-layer composite of support layer and $R_2Co_{17}$ layer is readily formed by our process.

Our process may be used to easily form large, thin $RCo_5$ permanent magnet layers in one piece and having good physical and magnetic strength. It is particularly applicable where a thin rare earth magnet, large in area compared to its thickness (e.g., in proportions such as 25 mm × 25 mm × 1.2 mm thick), is required.

In the above example iron powder was used to form the support layer in our laminate structure. However, it will be appreciated that other transition elements which are ferromagnetic, for example, nickel and cobalt, may also be employed. Alloys of iron, nickel and cobalt may also be used. However, it is preferred to use iron because it is relatively inexpensive and readily available.

Our process has been illustrated in terms of the use of a samarium-cobalt permanent magnet. This is a preferred embodiment. However, other rare earth-cobalt compositions are likewise quite brittle and are also readily improved by manufacture in accordance with our method. The other rare earth-cobalt compositions which have been used to produce strong permanent magnets are those which employ as the rare earth metal any of the following: yttrium, lanthanum, cerium, praseodymium, neodymium, promethium, europium, gadolinium, terbium, dysprosium, holmium, erbium, thulium, ytterbium and lutecium. The rare earth constituent may also be in the form of misch metal, a naturally occurring composition. An exemplary misch metal is cerium misch metal which typically comprises, by weight, about 53% cerium, 24% lanthanum, 5% praseodymium, 16% neodymium, and 2% other rare earths.

As indicated above, the laminated permanent magnet structures may be produced by pressing the powder layers in a rigid die uniaxially, or the layers may be formed in a flexible sleeve or die and pressed isostatically. Generally, it is desired to press the layers under the influence of a magnetic field just prior to and during final pressing so that the rare earth-cobalt materials are magnetically aligned. It is desired that they be compacted under as high a pressure as practical so that a reasonable density is obtained in the green compact. This makes the sintering more effective and increases the strength of the green compact prior to sintering.

We employ a sintering temperature that is particularly suitable to obtain optimum magnetic properties of the rare earth-cobalt layer. Such sintering temperatures are typically in the range from about 950° up to about 1200° C. Temperatures of the order of 1100° C. are preferred, e.g., for $SmCo_5$. Sintering temperatures in this range are also suitable for sintering of the iron or other transition metal support layer.

Compacting and sintering are carried out to obtain a substantially stable $RCo_5$ permanent layer that is well bonded to the ferromagnetic support layer. Preferably the density of the $RCo_5$ layer is such that its pores are substantially noninterconnecting. This usually requires a density of about 87% of the theoretical density of the $RCo_5$.

While our invention has been disclosed in terms of a few specific embodiments thereof, it will be appreciated that other forms could readily be adapted by one skilled in the art. Accordingly, the scope of our invention is to be considered limited only by the following claims.

What is claimed is:

1. A method of making a laminate permanent magnet body having a rare earth metal-cobalt permanent magnet layer supported on a base layer, said method comprising forming in a die a first powder layer containing an $RCo_5$ composition where R denotes a rare earth metal, a second powder layer containing an $R_2Co_{17}$ composition, and a third powder layer of a composition selected from the group consisting of iron and iron-based ferromagnetic alloys, subjecting the layers to a magnetic field to magnetically orient the rare earth metal-cobalt composition powder, compressing the distinct layers to form a self-sustaining laminated green compact, and sintering the compact at a temperature in the range of about 950° to 1200° C. to densify the compact, the thickness of the $R_2Co_{17}$ layer in said compact being at least sufficient to form a continuous layer between the $RCo_5$ layer and the iron-containing layer.

2. A method of making a laminate permanent magnet body having a rare earth metal-cobalt permanent magnet layer supported on a base layer, said method comprising forming in a die a first powder layer consisting essentially of an $SmCo_5$ composition, a second powder layer consisting essentially of $Sm_2Co_{17}$, and a third powder layer consisting essentially of iron, subjecting the layers to a magnetic field to magnetically orient the samarium-cobalt composition powder, compressing the distinct layers to form a self-sustaining laminated green compact, and sintering the compact at a temperature in the range of about 950° to 1200° C. to densify the compact, the thickness of the $R_2Co_{17}$ layer in said compact being at least sufficient to form a continuous layer between the $RCo_5$ layer and the iron-containing layer.

3. A method of making a laminate permanent magnet body having a rare earth metal-cobalt permanent magnet layer supported on a base layer, said method comprising forming in a die a first powder layer consisting essentially of an $R_2Co_{17}$ composition where R denotes a rare earth metal, and a second powder layer of a composition selected from the group consisting of iron and iron-based ferromagnetic alloys, subjecting the layers to a magnetic field to magnetically orient the rare earth metal-cobalt composition powder, compressing the distinct layers to form a self-sustaining laminated green compact, and sintering the compact at a temperature in the range of about 950° to 1200° C. to densify the compact.

4. A method of making a laminate permanent magnet body having a rare earth metal-cobalt permanent magnet layer supported on a base layer, said method comprising forming in a die a first powder layer consisting essentially of an $RCo_5$ composition, and a second powder layer of iron containing no more than one atomic percent of oxygen, subjecting the layers to a magnetic field to magnetically orient the rare earth metal-cobalt composition powder, compressing the distinct layers to form a self-sustaining laminated green compact, and sintering the compact at a temperature in the range of about 950° to 1200° C. to densify the compact.

* * * * *